(12) United States Patent
Ye et al.

(10) Patent No.: US 11,570,447 B2
(45) Date of Patent: Jan. 31, 2023

(54) VIDEO CODING AND VIDEO DECODING

(71) Applicant: HANGZHOU HIKVISION DIGITAL TECHNOLOGY CO., LTD., Hangzhou (CN)

(72) Inventors: Shurui Ye, Hangzhou (CN); Li Wang, Hangzhou (CN)

(73) Assignee: HANGZHOU HIKVISION DIGITAL TECHNOLOGY CO., LTD.

( * ) Notice: Subject to any disclaimer, the term of this patent is extended or adjusted under 35 U.S.C. 154(b) by 0 days.

(21) Appl. No.: 17/418,700

(22) PCT Filed: Dec. 2, 2019

(86) PCT No.: PCT/CN2019/122362
§ 371 (c)(1),
(2) Date: Jun. 25, 2021

(87) PCT Pub. No.: WO2020/134880
PCT Pub. Date: Jul. 2, 2020

(65) Prior Publication Data
US 2022/0070473 A1    Mar. 3, 2022

(30) Foreign Application Priority Data

Dec. 28, 2018   (CN) .......................... 201811628690.X

(51) Int. Cl.
*H04N 19/159*   (2014.01)
*H04N 19/119*   (2014.01)
(Continued)

(52) U.S. Cl.
CPC ......... *H04N 19/159* (2014.11); *H04N 19/119* (2014.11); *H04N 19/176* (2014.11);
(Continued)

(58) Field of Classification Search
CPC .......................... H04N 19/159; H04N 19/119
See application file for complete search history.

(56) References Cited

U.S. PATENT DOCUMENTS

| 8,964,847 B2 | 2/2015 | Sugio et al. |
| 9,456,217 B2 | 9/2016 | Sugio et al. |

(Continued)

FOREIGN PATENT DOCUMENTS

| AU | 2016270043 | 11/2017 |
| CN | 103503450 | 1/2014 |

(Continued)

OTHER PUBLICATIONS

CN Office Action issued in Chinese Appln. No. 2019101048015, dated Aug. 28, 2019, 14 pages (With English Translation).

(Continued)

*Primary Examiner* — Jerry T Jean Baptiste
(74) *Attorney, Agent, or Firm* — Fish & Richardson P.C.

(57) ABSTRACT

The disclosure provides a video coding method and a video coding apparatus and a video decoding method and a video decoding apparatus. The video coding method includes: when determining that a current block is coded in intra block copy prediction mode, carrying first indication information and second indication information in bitstream data corresponding to the current block by a video coder, wherein the first indication information specifies that a prediction mode of the current block is intra prediction, the second indication information specifies that the current block is coded in intra block copy prediction mode; and sending the bitstream data with the first indication information and the second indication information by the video coder. In this way, efficiency of a video decoder to know that a data block is coded in intra block copy prediction mode may be improved by using the video coding method, and consistence between syntax and (Continued)

semantics when prediction coding/decoding the data block in intra block copy prediction mode may be ensured.

17 Claims, 4 Drawing Sheets

(51) Int. Cl.
*H04N 19/176* (2014.01)
*H04N 19/186* (2014.01)
*H04N 19/46* (2014.01)
*H04N 19/70* (2014.01)

(52) U.S. Cl.
CPC ........... *H04N 19/186* (2014.11); *H04N 19/46* (2014.11); *H04N 19/70* (2014.11)

(56) References Cited

U.S. PATENT DOCUMENTS

| | | | |
|---|---|---|---|
| 9,826,249 | B2 | 11/2017 | Sugio et al. |
| 10,129,564 | B2 | 11/2018 | Sugio et al. |
| 10,484,708 | B2 | 11/2019 | Sugio et al. |
| 2012/0300846 | A1 | 11/2012 | Sugio et al. |
| 2015/0063440 | A1 | 3/2015 | Chao et al. |
| 2015/0131725 | A1 | 5/2015 | Sugio et al. |
| 2015/0139296 | A1* | 5/2015 | Yu .................. H04N 19/103 375/240.02 |
| 2016/0227244 | A1 | 8/2016 | Rosewarne |
| 2016/0241870 | A1 | 8/2016 | Sugio et al. |
| 2016/0330474 | A1 | 11/2016 | Liu et al. |
| 2016/0360210 | A1 | 12/2016 | Xiu et al. |
| 2017/0142418 | A1 | 5/2017 | Li et al. |
| 2017/0302935 | A1 | 10/2017 | Li et al. |
| 2018/0063546 | A1 | 3/2018 | Sugio et al. |
| 2018/0139461 | A1 | 5/2018 | Liu et al. |
| 2019/0020893 | A1 | 1/2019 | Sugio et al. |
| 2021/0195239 | A1* | 6/2021 | Kim .................. H04N 19/46 |

FOREIGN PATENT DOCUMENTS

| | | |
|---|---|---|
| CN | 104067524 | 9/2014 |
| CN | 105208396 | 12/2015 |
| CN | 105392008 | 3/2016 |
| CN | 105474641 | 4/2016 |
| CN | 105493505 | 4/2016 |
| CN | 105532000 | 4/2016 |
| CN | 106105215 | 11/2016 |
| CN | 106416243 | 2/2017 |
| CN | 106416245 | 2/2017 |
| CN | 106489267 | 3/2017 |
| CN | 106576171 | 4/2017 |
| CN | 107071429 | 8/2017 |
| CN | 107079161 | 8/2017 |
| CN | 107615763 | 1/2018 |
| CN | 107646195 | 1/2018 |
| CN | 107660341 | 2/2018 |
| CN | 107667530 | 2/2018 |
| CN | 107852490 | 3/2018 |
| CN | 108449599 | 8/2018 |
| CN | 109743576 | 5/2019 |
| CN | 109819264 | 5/2019 |
| CN | 109874011 | 6/2019 |
| GB | 2539212 | 12/2016 |
| WO | 2015106121 | 7/2015 |
| WO | 2.015176678 | 11/2015 |
| WO | 2015196029 | 12/2015 |
| WO | 2016196043 | 12/2016 |

OTHER PUBLICATIONS

CN Office Action issued in Chinese Appln. No. 2019101048015, dated Nov. 27, 2019, 15 pages (With English Translation).
CN Office Action issued in Chinese Appln. No. 201910104802X, dated Aug. 20, 2019, 14 pages (With English Translation).
CN Office Action issued in Chinese Appln. No. 2019101048034, dated Aug. 30, 2019, 12 pages (With English Translation).
CN Office Action issued in Chinese Appln. No. 2019101048034, dated Nov. 25, 2019, 9 pages (With English Translation).
PCT International Search Report in International Appln. No. PCT/CN2019/122362, dated Mar. 4, 2020, 4 pages (With English Translation).
PCT International Search Report in International Appln. No. PCT/CN2019/122368, dated Feb. 19, 2020, 6 pages (With English Translation).
PCT International Search Report in International Appln. No. PCT/CN2019/122372, dated Feb. 25, 2020, 6 pages (With English Translation).
PCT International Search Report in International Appln. No. PCT/CN2019/122373, dated Mar. 4, 2020, 4 pages (With English Translation).
Extended European Search Report issued in European Application No. 19901742.7, dated Jan. 26, 2022, 8 pages.
Zuo, "Intra block copy for intra-frame coding", Joint Video Experts Team (JVET) of ITU-T SG 16 WP3 and IS0/IEC JTC 1/SC 29/WG 11, 10th Meeting: San Diego, US, JVET-J0042-v3, Apr. 10-20, 2018, 6 pages.

\* cited by examiner

VIDEO CODING AND VIDEO DECODING

CROSS REFERENCE TO RELATED APPLICATIONS

This application is the national phase application of International Application No. PCT/CN2019/122362, filed on Dec. 2, 2019, which claims priority to a Chinese Patent Application No. 201811628690.X, filed on Dec. 28, 2018, the entire contents of which are incorporated herein by reference for all purposes.

TECHNICAL FIELD

The present disclosure relates to video coding and decoding technology, and in particular to intra block copy technology.

BACKGROUND

Prediction coding is a common coding method in video compression. Commonly used prediction coding modes may include an intra prediction mode (also named as MODE INTRA) and an inter prediction mode (also named as MODE INTER). Intra prediction indicates a prediction realized by using only data elements of a current picture (such as sample values). Inter prediction indicates a prediction realized by using data elements of coded pictures other than the current picture (such as sample values or motion vectors). According to relevant video compression standard, slice types in a video may include I slice (intra coding slice), P slice (forward prediction coding slice), or B slice (bidirectional prediction coding slice)

Intra block copy technique has been proposed. In the intra block copy technique, also named as intra block matching, a coded reconstruction area of the current picture is taken as a reference area for prediction coding. A prediction mode of a coding unit that is coded in the intra block copy technique may be inter prediction. The intra block copy technique can be used for coding various slices including an I slice, a P slice, and a B slice. For an I slice, if the intra block copy technique is allowed for coding it, the slice type of it may be modified to P slice.

SUMMARY

According to a first aspect of the embodiments of the present disclosure, there is provided a video coding method performed by a video coder, including: in response to determining that a current block is coded in intra block copy prediction mode, carrying first indication information and second indication information in bitstream data corresponding to the current block, wherein the first indication information specifies that a prediction mode of the current block is intra prediction, the second indication information specifies that the current block is coded in intra block copy prediction mode; and sending the bitstream data with the first indication information and the second indication information.

According to a second aspect of the embodiments of the present disclosure, there is provided a video decoding method performed by a video decoder, including: acquiring bitstream data corresponding to a current block; and in response to determining that first indication information and second indication information is carried in the bitstream data, determining that the current block is coded in intra block copy prediction mode, wherein the first indication information specifies that a prediction mode of the current block is intra prediction, the second indication information specifies that the current block is coded in intra block copy prediction mode.

According to a third aspect of the embodiments of the present disclosure, there is provided a video coder, including: a memory for storing computer programs; and a processor, configured to execute the computer programs stored in the memory to implement the above video coding method.

According to a fourth aspect of the embodiments of the present disclosure, A video decoder, including: a memory for storing computer programs; and a processor, configured to execute the computer programs stored in the memory to implement the above video decoding method.

According to a fifth aspect of the embodiments of the present disclosure, A storage medium having computer programs stored thereon, wherein when the computer programs are executed by a processor, the processor is caused to perform the above video coding method.

According to a sixth aspect of the embodiments of the present disclosure, A storage medium having computer programs stored thereon, wherein when the computer programs are executed by a processor, the processor is caused to perform the above video decoding method.

According to the embodiments of the present disclosure, efficiency of a video decoder to know that a data block is coded in intra block copy prediction mode may be improved, and consistence between syntax and semantics when prediction coding/decoding the data block in intra block copy prediction mode may be ensured.

DETAILED DESCRIPTION OF THE EMBODIMENTS

Figure 1:
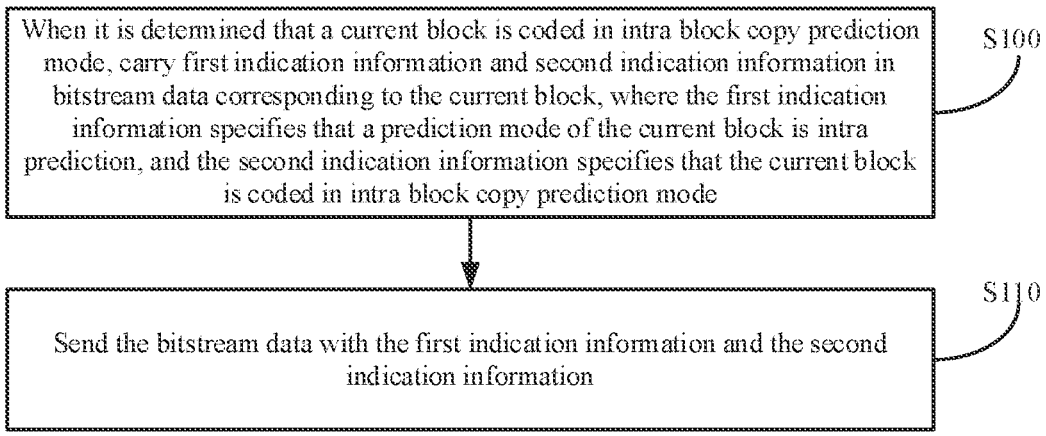
FIG. 1 is a flowchart of a video coding method according to an exemplary embodiment of the present disclosure.

Exemplary embodiments will be described in detail herein, which are schematically shown in the accompanying drawings. For the following description related to the drawings, unless otherwise indicated, the same reference numerals in different drawings represent the same or similar elements. The embodiments described in the following do not represent all embodiments consistent with the present disclosure. Rather, they are merely examples of devices and methods consistent with some aspects of the present disclosure as described in the appended claims.

The terms used in the present disclosure are used for the purpose of describing particular embodiments only while not intended to limit the present disclosure. The singular forms "a", "said", and "the" used in the present disclosure and the appended claims shall be interpreted as also covering plural forms, unless the context clearly indicates other meanings.

In order to make the above objectives, features and advantages of the present disclosure more apparent, various embodiments of the present disclosure will be described in detail below in conjunction with the accompanying drawings.

FIG. 1 is a flowchart of a video coding method according to an embodiment of the present disclosure. The method may be performed by a video coder, and may include steps S100 to S110.

At step S100, when it is determined that a current block is coded in intra block copy prediction mode, first indication information and second indication information is carried in bitstream data corresponding to the current block. The first indication information specifies that a prediction mode of the current block is intra prediction. The second indication information specifies that the current block is coded in intra block copy prediction mode.

At step S110, the bitstream data with the first indication information and the second indication information is sent. For example, the bitstream data can be sent to a video decoder or a device for storing the bitstream data.

According to the embodiment, for a data block that is prediction coded in intra block copy prediction mode, first indication information that specifies that the data block is coded in intra prediction and second indication information that specifies that the data block is coded in intra block copy prediction mode is carried in bitstream data corresponding to the data block. In this way, efficiency of a video decoder to know that the data block is coded in intra block copy prediction mode may be improved, and consistence between syntax and semantics when prediction coding/decoding the data block in intra block copy prediction mode may be ensured.

According to an embodiment of the present disclosure, the first indication information may include a first flag, where the first flag specifies that a slice to which a slice in which the current block is located is I slice. Determining that the current block is to be coded in intra block copy prediction mode may include: when it is determined that an intra prediction mode with a lowest rate distortion cost is the intra block copy prediction mode, determining that the current block is to be coded in intra block copy prediction mode.

Figure 3A:
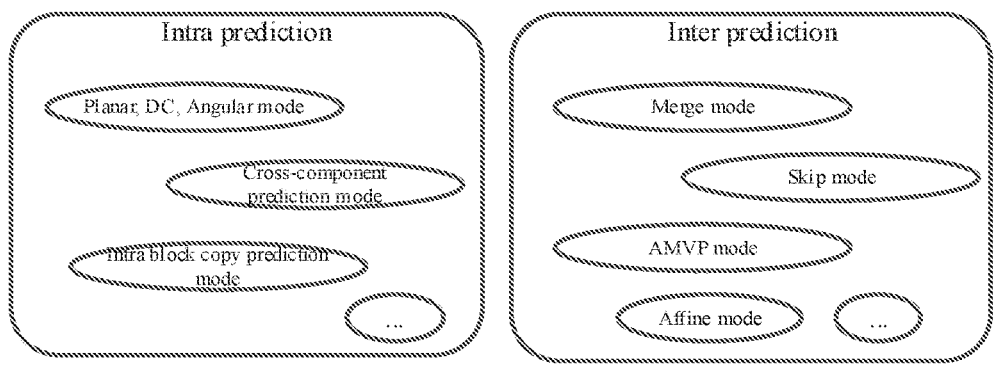
FIG. 3A is a schematic diagram illustrating prediction mode classification according to an exemplary embodiment of the present disclosure.

In an embodiment of the present disclosure, prediction mode classification is shown in FIG. 3A. The intra prediction may include, but is not limited to, a Planar mode, a DC mode, an angular mode, a cross-component prediction mode, an intra block copy prediction mode, and so on. The inter prediction may include, but is not limited to, a Merge mode, an Advanced Motion Vector Prediction (AMVP for short) mode, a Skip mode, affine model-based motion compensation, and so on.

That is, in an embodiment of the present disclosure, an intra block copy prediction mode is no longer a mode of inter prediction, but a mode of intra prediction.

In an embodiment of the present disclosure, an intra block copy prediction mode is allowed for intra prediction of a data block in an I slice. If there is a data block to be coded in intra prediction in a B slice or a P slice, the intra block copy prediction mode is also allowed for coding the data block.

In the embodiment, considering that only intra prediction is allowed for coding a block of I slice, for a data block in an I slice, the first indication information may include a flag (referred to as a first flag herein) that specifies a slice in which the current block is located is I slice. That is, by using the first flag that specifies a slice in which the current block is located is I slice, a video coder can specify that the current block is coded in intra prediction, without additionally carrying specific information that specifies that the current block is coded in intra prediction. This reduces bit rate cost of the current block and improves coding performance.

In the embodiment, when determining that the current block is to be coded in intra prediction, the video coder can determine respective rate distortion costs of various intra prediction modes, and choose an intra prediction mode with the lowest rate distortion cost as the intra prediction mode for coding the current block.

For example, the video coder can determine respective rate distortion costs for coding the current block in intra block copy prediction mode, DC mode, Planar mode, angular mode, cross-component prediction mode, etc., and choose an intra prediction mode with the lowest rate distortion cost as the intra prediction mode for coding the current block. When determining that the rate distortion cost of the intra block copy prediction mode for coding the current block is the lowest, the video coder can determine that the current block is to be coded in intra block copy prediction mode.

According to an embodiment of the present disclosure, in order to avoid the effect on coding bits of the inter prediction mode, a video coder can use a separate flag bit to explicitly specify whether a current block is coded in intra block copy prediction mode. Correspondingly, the second indication information may include a second flag. If a value of the second flag is a first value, the second flag specifies that the current block is coded in intra block copy prediction mode.

In the embodiment, the video coder may carry a flag bit (referred to as a second flag herein) in bitstream data of the current block, so to specify whether the current block is coded in intra block copy prediction mode. When the value of the second flag is the first value (for example, 1), the second flag may specify that the current block is coded in intra block copy prediction mode. In addition, when the value of the second flag is a second value (for example, 0), the second flag may specify that the current block is not coded in intra block copy prediction mode.

In an example, for an I slice, it may adopt dual tree mode, in which there are independent block partition structures for luma and chroma respectively. For both the chroma coding unit and the luma coding unit, an explicit flag bit can specify whether the block is coded in intra block copy prediction mode. Accordingly, in the example, when the current block is a luma coding unit or a chroma coding unit, if the value of the second flag of the current block is the first value, the second flag may specify that the luma coding unit or the chroma coding unit is coded in intra block copy prediction mode.

In addition, in an embodiment of the present disclosure, considering that available modes of a chroma coding unit may include a corresponding luma component mode (DM, Direct Mode), when the corresponding luma component mode is set as "on", a prediction mode adopted for coding the chroma coding unit can be determined according to a prediction mode adopted for coding a luma coding unit corresponding to the chroma coding unit (specific implementation examples will be described in detail later). Therefore, whether the chroma coding unit is coded in intra block copy prediction mode, it can be implicitly specified by corresponding luma component mode information (for example, a DM flag bit), thereby avoiding additional coding flag bits for the chroma coding unit and saving coding bits.

In an example, when the current block is a chroma coding unit, the second indication information includes a third flag, where the third flag specifies that corresponding luma component mode information of the chroma coding unit.

In addition, in an embodiment of the present disclosure, considering that slices P and slices B can be prediction coded in inter prediction, disabling slices P and slices B from being coded in intra block copy prediction mode may cause a relatively low coding performance loss but can reduce complexity of coding slices P and slices B. Therefore, for P slice and B slice, intra block copy prediction mode may be disabled, and only slices I are allowed to be coded in intra block copy prediction mode.

In addition, considering that in existing prediction coding scheme, when an intra block copy prediction mode is used for prediction coding an I slice, slice type of the I slice may be modified to P slice. That is, for a slice whose slice type is identified as P slice, its actual slice type may be I slice and accordingly it can be referred to as pseudo slice P. Further, an I slice is not allowed to be coded by using any reference picture other than a current picture as a prediction reference. Therefore, a P slice represents a slice whose slice type is identified as P slice and for which a reference picture other than the current picture is used as a prediction reference.

Besides, in an embodiment of the present disclosure, a common syntax element of a slice that is allowed to be coded in intra block copy prediction mode and a slice for which intra block copy prediction mode is disabled can maintain the same entropy coding context initial value, so that setting the entropy coding context initial value can be improved to be more reasonable and consistent with definition of the entropy coding context initial value.

According to an embodiment of the present disclosure, for a first slice that is allowed to be coded in intra block copy prediction mode and a second slice for which intra block copy prediction mode is disabled, respective common syntax elements of the first slice and the second slice maintain the same entropy coding context initial value.

In an example, the first slice is an I slice that is allowed to be coded in intra block copy prediction mode, and the second slice is an I slice for which intra block copy prediction mode is disabled.

In addition, the intra block copy prediction mode is a kind of intra prediction mode. Therefore, when a video coder prediction codes a current block in intra block copy prediction mode, carrying information of an inter prediction mode in which a current picture is not added into a reference picture list in bitstream data of the current block may not significantly improve decoding performance. Therefore, for a data block that is coded in intra block copy prediction mode, information of an inter prediction mode in which a current picture is not added into a reference picture list may be not carried in the bitstream data, so as to reduce bit rate cost and improve coding performance.

According to an embodiment of the present disclosure, after it is determined that a current block is coded in intra block copy prediction mode, information of an inter prediction mode in which a current picture is not added into a reference picture list may not be coded.

In an example, the inter prediction mode may include at least one of: a merge mode with motion vector difference (also named as MVD for short), affine model-based motion compensation, affine model-based motion compensation or a Triangle mode.

In addition, in an embodiment of the present disclosure, considering that there is no temporal candidate in intra block copy prediction mode, and that spatial correlation in intra block copy prediction mode is also weaker than spatial correlation in inter prediction mode, for a data block that is coded in intra block copy prediction mode, it may reduce a maximum number of intra block copy merging block vector prediction candidates, thereby decreasing coding bits of candidate index values.

In an example, the candidates in the merge list may include one or more of a spatial domain candidate, a time domain candidate, a merge candidate, and a zero motion vector of a current block.

According to an embodiment of the present disclosure, for a first data block that is coded in intra block copy prediction mode and a second data block that is not coded in intra block copy prediction mode, a maximum number of intra block copy merging block vector prediction candidates for the first data block is smaller than a maximum number of merge motion vector prediction candidates for the second data block.

In addition, in an embodiment of the present disclosure, considering that coding performance of prediction coding a data block in intra block copy prediction mode is also affected by reconstructed area information of a slice in which the data block is located. Therefore, in a case that a video coder and a video decoder have negotiated judgment strategy in advance or in a case that the video coder and the video decoder are configured with the same judgment strategy, whether a data block is coded in intra block copy prediction mode, it can be determined from the reconstructed area information of the slice in which the data block is located. Therefore, it can be effectively determined whether the data block is coded in intra block copy prediction mode without carrying specific indication information in bitstream data of the data block.

According to an embodiment of the present disclosure, determining whether the current block is coded in intra block copy prediction mode may include: determining whether the current block is coded in intra block copy prediction mode according to the reconstructed area information of the slice in which the current block is located.

In some embodiments, the reconstructed area information may include at least one of: a gradient value of surrounding area of a current block, or mode information of adjacent data blocks of the current block.

For example, the surrounding area of the current block may include left M columns and upper N rows of the current block in the slice in which the current block is located, where M and N are both positive integers.

In an example, when the reconstructed area information includes a gradient value of surrounding area of the current block, determining whether the current block is coded in intra block copy prediction mode according to the reconstructed area information of the slice in which the current block is located, may include: if the gradient value of surrounding area of the current block is greater than a first preset threshold, determining that the current block is coded in intra block copy prediction mode; if the gradient value of surrounding area of the current block is less than a second preset threshold, determining that the current block is not coded in intra block copy prediction mode, where the first preset threshold value is greater than the second preset threshold value.

In the example, for coding the current block, the video coder may calculate the gradient value of surrounding area of the current block and compare the gradient value of surrounding area of the current block with a preset threshold. If the gradient value of surrounding area of the current block is greater than a first preset threshold, which can be set according to actual requirements, the video coder can determine that the current block is to be coded in intra block copy prediction mode. If the gradient value of surrounding area of the current block is less than a second preset threshold, which can be set according to actual requirements and is less than the first preset threshold, the video coder can determine that the current block is not to be coded in intra block copy prediction mode.

In another example, when the reconstructed area information includes the mode information of adjacent data blocks of the current block, determining whether the current block is coded in intra block copy prediction mode according to the reconstructed area information of the slice in which the current block is located, may include: if a proportion which indicates how many adjacent data blocks of the current block are coded in inter prediction mode exceeds a third preset threshold, determining that the current block is not coded in intra block copy prediction mode.

In the example, for coding the current block, the video coder may calculate a proportion which indicates how many the adjacent data blocks of the current block are coded in inter prediction mode according to mode information of respective adjacent data blocks of the current block (that is, a ratio of a number of adjacent data blocks of the current block which are coded in inter prediction mode to a number of all adjacent data blocks of the current block) and compare the proportion with a preset threshold (referred to as a third preset threshold herein, which can be set according to actual requirements, such as 50%). If the proportion exceeds the third preset threshold, the video coder can determine that the current block is not to be coded in intra block copy prediction mode.

It should be noted that in the example, when the proportion does not exceed the third preset threshold, the video coder can use other strategies to determine whether the current block is to be coded in intra block copy prediction mode, such as determining whether the current block is to be coded in intra block copy prediction mode according to the rate distortion cost as described above.

In some embodiments, in the example, adjacent data blocks of a current block are spatial adjacent blocks, including a lowermost spatial adjacent block on left side of the current block, a rightmost spatial adjacent block on upper side of the current block, a nearest spatial adjacent block on upper right corner of the current block, a nearest spatial adjacent block on lower left corner of the current block, and a nearest spatial adjacent block on upper left corner of the current block.

The video coding methods according to various embodiments of the present disclosure are described above, and corresponding video decoding methods will be described below.

Figure 2:
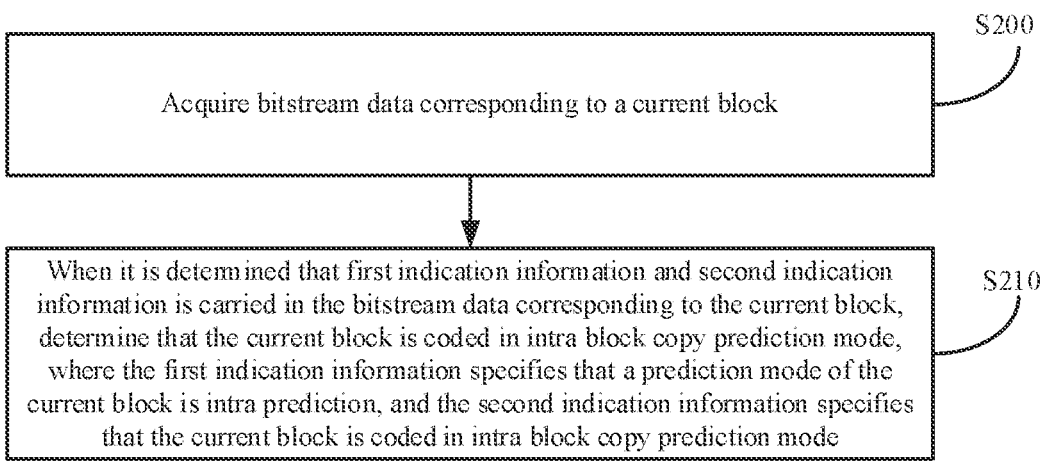
FIG. 2 is a flowchart of a video decoding method according to an exemplary embodiment of the present disclosure.

FIG. 2 is a flowchart of a video decoding method according to an embodiment of the present disclosure. The method may be performed by a video decoder, and may include steps S200 to S210.

At step S200, bitstream data corresponding to a current block is acquired. For example, a video decoder may acquire the bitstream data by receiving the bitstream data sent from a video coder, or may acquire the bitstream data from a device for storing the bitstream data.

At step S210, when it is determined that first indication information and second indication information is carried in the bitstream data corresponding to the current block, it is determined that the current block is coded in intra block copy prediction mode, where the first indication information specifies that a prediction mode of the current block is intra prediction, and the second indication information specifies that the current block is coded in intra block copy prediction mode.

In an embodiment of the present disclosure, when decoding a current block, a video decoder may determine whether first indication information and second indication information is carried in bitstream data corresponding to the current block. When the first indication information and the second indication information is carried in the bitstream data corresponding to the current block, the video decoder may determine that the current block is coded in intra block copy prediction mode.

According to the embodiment, it may be determined that the current block is coded in intra block copy prediction mode based on first indication information and second indication information carried in bitstream data corresponding to a data block. In this way, efficiency of a video decoder to know that the data block is coded in intra block copy prediction mode may be improved, and consistence between syntax and semantics when prediction coding/decoding the data block in intra block copy prediction mode may be ensured.

According to an embodiment of the present disclosure, the first indication information may include a first flag, where the first flag specifies that a slice in which a current block is located is I slice.

In the embodiment, considering that only intra prediction is allowed for coding a block of I slice, when determining that a flag (referred to as a first flag herein) that specifies that a slice in which a current block is located is I slice is carried in bitstream data of the current block, a video decoder can efficiently and accurately determine that the current block is coded in intra prediction.

According to an embodiment of the present disclosure, the second indication information may include a second flag, and if a value of the second flag is a first value, the second flag may specify that the current block is coded in intra block copy prediction mode.

When decoding the current block, the video decoder may determine whether the current block is coded in intra block copy prediction mode according to the value of the second flag carried in the bitstream data of the current block. If the value of the second flag carried in the bitstream data of the current block is the first value (for example, 1), the video decoder may determine that the current block adopts the intra block copy prediction mode.

In an example, when the current block is a luma coding unit or a chroma coding unit, if the second flag is carried in the bitstream data of the current block, and the value of the second flag is the first value, the video decoder may determine that the luma coding unit or the chroma coding unit is coded in intra block copy prediction mode.

In an example, when the current block is a chroma coding unit, the second indication information includes a third flag, where the third flag specifies that corresponding luma component mode information of the chroma coding unit.

In the example, when the current block is a chroma coding unit and a corresponding luma component mode is set as "on" for the current block, the video decoder may know, by acquiring the third flag in the bitstream data of the current block, that the corresponding luma component mode is set as "on" for the current block, and may determine a prediction mode for coding the chroma coding unit according to a prediction mode for coding a luma coding unit corresponding to the chroma coding unit (specific implementation will be described in detail later).

According to an embodiment of the present disclosure, corresponding to the coding end, when determining that a slice in which the current block is located is P slice or B slice, the video decoder can determine that the current block is not coded in intra block copy prediction mode.

According to an embodiment of the present disclosure, corresponding to the coding end, when decoding a current block, a video decoder may calculate a gradient value of surrounding area of a current block, and compare the gradient value of surrounding area of the current block with a preset value. If the gradient value of surrounding area of the current block is greater than a first preset threshold, the video decoder may determine that the current block is coded in intra block copy prediction mode. If the gradient value of surrounding area of the current block is less than a second preset threshold (the second preset threshold value is less than the first preset threshold value), the video decoder may determine that the current block is not coded in intra block copy prediction mode.

According to an embodiment of the present disclosure, corresponding to the coding end, when decoding a current block, a video coder may calculate a proportion which indicates how many adjacent data blocks of the current block are coded in inter prediction mode according to mode information of respective adjacent data blocks of the current block and compare the proportion with a third preset threshold. If the proportion exceeds the third preset threshold, the video coder can determine that the current block is not coded in intra block copy prediction mode. When the proportion does not exceed the third preset threshold, the video coder may determine whether the current block is coded in intra block copy prediction mode according to whether the first indication information and the second indication information is carried in bitstream data of the current block.

To make those skilled in the art better understand the present disclosure, some embodiments of the present disclosure are described in detail below.

Embodiment 1

At the coding end, if it is determined that a current block is coded in intra block copy prediction mode, its prediction mode is intra prediction. First indication information that specifies that a prediction mode of the current block is intra prediction (in the embodiment, pred_mode_flag is taken as an example) and second indication information that specifies that the current block is coded in intra block copy prediction mode (in the embodiment, cpr_flag is taken as an example) is carried in bitstream data of the current block.

Correspondences between values of pred_mode_flag and cpr_flag and prediction modes may be negotiated and determined by a video coder and a video decoder. For example, when the value of pred_mode_flag is 1, it specifies that the prediction mode of the current block is intra prediction; when the value of cpr_flag is 1, it specifies that the current block is coded in intra block copy prediction mode.

At the decoding end, pred_mode_flag and cpr_flag in the bitstream data of the current block can be acquired. For example, if the values of pred_mode_flag and cpr_flag are both 1, it can be determined that the prediction mode of the current block is intra prediction, and the intra block copy prediction mode is adopted for coding the current block.

In addition, in the embodiment, if the value of pred_mode_flag is 0, it specifies that the prediction mode of the current block is inter prediction; if pred_mode_flag does not exist, it can be inferred that the prediction mode of the current block is intra prediction.

In the embodiment, when the video decoder calculates a boundary strength in order to perform deblocking filtering on the current block, if it is determined that the prediction mode of the current block is intra prediction and the intra block copy prediction mode is adopted for coding the current block, the boundary strength is not set to a certain preset value (for example, a constant of 2), but the boundary strength is determined according to factors regarding such as a reference picture or a block vector of the current block, as for an inter prediction mode.

Figure 3B:
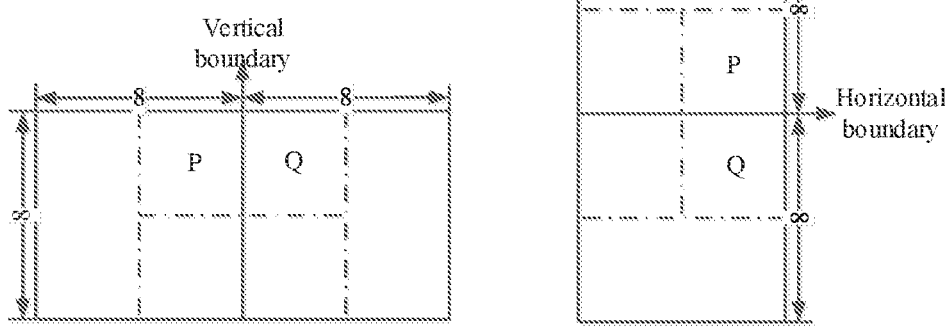
FIG. 3B is a schematic diagram illustrating blocks which are used as reference(s) in acquiring boundary strength according to an exemplary embodiment of the present disclosure.

For example, referring to FIG. 3B, if respective prediction modes of data blocks on both sides of the boundary (such as a block P and a block Q as shown in FIG. 3B) are intra prediction other than the intra block copy prediction mode, the boundary strength can be set to a preset value. If the block P or the block Q is coded in intra block copy prediction mode, a boundary strength value may be determined based on relevant factors such as whether the block P or the block Q contains a non-zero transform coefficient, whether the same reference picture is used for the block P and the block Q, and a number of motion vectors (mv) or block vectors (bv) of the block P is the same as a number of motion vectors (mv) or block vectors (bv) of the block Q.

Embodiment 2

At the coding end, if a slice in which a current block is located is I slice and an intra block copy prediction mode is allowed for coding the current block, slice type of the slice is not modified to P slice, but is still I slice. A first flag that specifies that a slice in which the current block is located is I slice and a second flag that specifies that the current block is coded in intra block copy prediction mode (in the embodiment, cpr_flag is taken as an example) is carried in bitstream data of the current block. When the value of cpr_flag is 1, it specifies that the current block is coded in intra block copy prediction mode.

At the decoding end, the first flag and cpr_flag in the bitstream data of the current block can be acquired. When the first flag is acquired, it is determined that the slice in which the current block is located is I slice. Because only intra prediction is allowed for coding a block of I slice, it can be determined that a prediction mode of the current block is intra prediction. When cpr_flag is acquired, and the value of cpr_flag is 1, it can be determined that the current block is coded in intra block copy prediction mode.

In the embodiment, for a data block of I slice that is coded in intra block copy prediction mode, its slice type is still identified as I slice, and an I slice flag is used as indication information that specifies that the data block is coded in intra prediction. This ensures consistence between syntax and semantics and reduces bit rate cost.

Embodiment 3

When an I slice is coded in dual tree mode, in which a dual tree is used to partition a coding tree node. Each luma coding unit or chroma coding unit (a chroma coding unit contains a Cb block and a Cr block) can be regarded as a data block.

At the coding end, bitstream data of each luma coding unit or chroma coding unit may carry a flag bit (corresponding to the second flag, taking cpr_flag as an example) that specifies whether the block is coded in intra block copy prediction mode. When the value of cpr_flag is 1, it specifies that the luma coding unit or the chroma coding unit is coded in intra block copy prediction mode. The flag bit can be coded in equiprobability mode, or it can be coded in entropy coding mode.

At the decoding end, when it is parsed that cpr_flag is carried in bitstream data corresponding to a current luma coding unit or chroma coding unit, and the value of cpr_flag is 1, it can be determined that the luma coding unit or chroma coding unit is coded in intra block copy prediction mode.

In the embodiment, an explicit flag bit specifies whether the luma coding unit or the chroma coding unit is coded in intra block copy prediction mode. In this way, the effect on coding bits of the inter prediction mode is avoided, and efficiency of a video decoder to determine whether the luma coding unit or the chroma coding unit is coded in intra block copy prediction mode is improved.

Embodiment 4

When an I slice is coded in dual tree mode in which a dual tree is used to partition a coding tree node. For a luma coding unit, an explicit flag bit (corresponding to the second flag, taking cpr_flag as an example) may specify whether the luma coding unit is coded in intra block copy prediction mode. For a chroma coding unit, corresponding luma component mode information (for example, a DM flag bit) can be used to implicitly specify whether the chroma coding unit is coded in intra block copy prediction mode.

At the coding end, if a current chroma coding unit is coded in intra block copy prediction mode, it can be indicated by indicating that the current chroma coding unit is coded in corresponding luma component mode. For example, the DM flag bit can be carried in bitstream data of the current chroma coding unit, and the value of the DM flag bit can be set to true (it can be negotiated with a video decoder in advance, such as 1 for true and 0 for false).

At the decoding end, if it is parsed that the current chroma coding unit is coded in corresponding luma component mode (for example, the DM flag bit is carried in the bitstream data corresponding to the current chroma coding unit, and the value of the DM flag bit is true), and if a luma coding unit of which a luma coordinate position corresponds to a specific point coordinate (for example, a center point coordinate) of the chroma coding unit is coded in intra block copy prediction mode, it is determined that the chroma coding unit is coded in intra block copy prediction mode.

Embodiment 5

When an I slice is coded in dual tree mode in which a dual tree is used to partition a coding tree node. For a luma coding unit, an explicit flag bit (corresponding to the second flag, taking cpr_flag as an example) may specify whether the luma coding unit is coded in intra block copy prediction mode. For a chroma coding unit, corresponding luma component mode information (for example, a DM flag bit) can be used to implicitly specify whether the chroma coding unit is coded in intra block copy prediction mode.

At the coding end, if a current chroma coding unit is coded in intra block copy prediction mode, it can be indicated by indicating that the current chroma coding unit is coded in corresponding luma component mode. For example, the DM flag bit can be carried in bitstream data of the current chroma coding unit, and the value of the DM flag bit can be set to true.

At the decoding end, if it is parsed that the current chroma coding unit is coded in corresponding luma component mode (for example, the DM flag bit is carried in the bitstream data corresponding to the current chroma coding unit, and the value of the DM flag bit is true), an intra prediction mode adopted for coding the current chroma coding unit can be determined according to following rules:

1. if a plurality of luma coding units of which respective luma coordinate positions correspond to all coordinates in the current chroma coding unit are all coded in intra block copy prediction mode, it is determined that the current chroma coding unit is coded in intra block copy prediction mode;

2. if a luma coding unit of which a luma coordinate position corresponds to a center point coordinate of the current chroma coding unit is coded in Planar mode, a DC mode, an angular mode or a cross-component prediction mode (that is, an intra prediction mode other than the intra block copy prediction mode is adopted for coding a block), it is determined that the current chroma coding unit and the luma coding unit is coded in the same intra prediction mode;

3. if a luma coding unit of which a luma coordinate position corresponds to a center point coordinate of the current chroma coding unit is coded in intra block copy prediction mode, and among the plurality of luma coding units of which respective luma coordinate positions correspond to all coordinates in the current chroma coding unit, there is a luma coding unit that is not coded in intra block copy prediction mode, it is determined that the current chroma coding unit is coded in preset intra prediction mode, such as the Planar mode, the DC mode, the angular mode, or the cross-component prediction mode.

Figure 4:
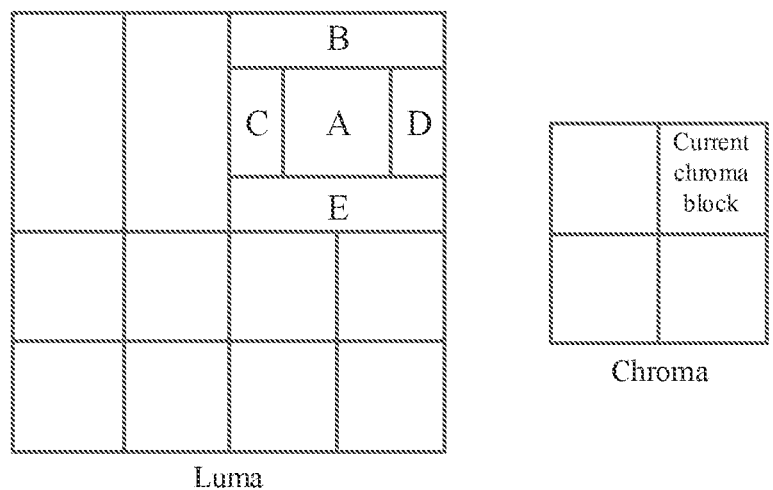
FIG. 4 is a schematic diagram illustrating a positional correspondence between luma and chroma according to an exemplary embodiment of the present disclosure.

For example, referring to a positional correspondence between luma and chroma shown in FIG. 4, a luma coding unit of which a luma coordinate position corresponds to a center point coordinate of the current chroma coding unit is block A, and luma coding units of which respective luma coordinate positions correspond to all coordinates in the current chroma coding unit include block A, block B, block C, block D and block E.

Embodiment 6

Considering that slices P and slices B can be prediction coded in inter prediction, disabling slices P and slices B from being coded in intra block copy prediction mode may cause a relatively low coding performance loss but can reduce complexity of coding slices P and slices B. Therefore, for slices P and slices B, intra block copy prediction mode may be disabled, and only slices I are allowed to be coded in intra block copy prediction mode.

At the coding end, if it is determined that a slice in which the current block is located is P slice or B slice, and a reference picture other than a current picture is used as a prediction reference, it is determined that the current block is not coded in intra block copy prediction mode.

At the decoding end, if it is determined that a slice in which the current block is located is P slice or B slice, and a reference picture other than a current picture is used as a prediction reference, it is determined that the current block is not coded in intra block copy prediction mode.

Embodiment 7

A first slice: intra block copy prediction mode is disabled for it;

A second slice: allowed to be coded in intra block copy prediction mode.

At the coding end and the decoding end, a common syntax element of the first slice and the second slice can maintain the same entropy coding context initial value.

For example, assuming that a slice A meets following conditions: 1. slice type is P slice; 2. a current picture supports dual tree mode; 3. the current picture is allowed to be coded in intra block copy prediction mode. A B slice meets following conditions: 1. the slice type is I slice; 2. the current picture supports dual tree mode; 3. for the current picture, intra block copy prediction mode is disabled.

At the coding end and the decoding end, the common syntax element of A slice and B slice (such as SplitFlag, BTSplitFlag, etc.) can maintain the same entropy coding context initial value.

In the embodiment, after the intra block copy prediction mode is allowed for coding slices I, an original syntax element can maintain original entropy coding context initial value, and an entropy coding context initial value of newly added syntax element may be the same as slices P or slices B, or may be different from both the slices P and the slice B.

In the embodiment, for a slice that is allowed to be coded in intra block copy prediction mode and a slice for which intra block copy prediction mode is disabled, if no new reference information source is added, the slice types of the two slices are essentially the same, the same entropy coding context initial value is more reasonable and consistent with definition of the entropy coding context initial value.

Embodiment 8

If a data block is coded in intra block copy prediction mode, information of an inter prediction mode that uses a non-current picture as a reference picture can be disabled. That is, the data block that is coded in intra block copy prediction mode may not code the information of the inter prediction mode in which the current picture is not added into a reference picture list. This reduces bit rate cost and improves coding performance.

At the coding end, when it is determined that the current block is coded in intra block copy prediction mode, the information of the inter prediction mode in which the current picture is not added into a reference picture list may not be coded. The information of the inter prediction mode may include a merge mode with motion vector difference (also named as MVD for short) of the current block, affine model-based motion compensation, affine model-based motion compensation and/or a Triangle mode. At the decoding end, when it is parsed or deduced from bitstream data that the current block is coded in intra block copy prediction mode, the information of the inter prediction mode may no longer be acquired from the bitstream data, but directly deduced to that the information of the inter prediction mode is disabled.

Embodiment 9

A maximum number of intra block copy merging block vector prediction candidates for a data block that is coded in intra block copy prediction mode is smaller than a maximum number of merge motion vector prediction candidates for a data block that is not coded in intra block copy prediction mode. There is no temporal candidate in intra block copy prediction mode, and that spatial correlation in intra block copy prediction mode is also weaker than spatial correlation in inter prediction mode. For the data block that is coded in intra block copy prediction mode, it may reduce the maximum number of intra block copy merging block vector prediction candidates, thereby decreasing coding bits of candidate index values.

For example, when constructing the merge list of the intra block copy prediction mode with the same construction logic at the coding end and the decoding end, only first X valid candidates can be selected, where X<Y, and Y is the maximum number of merge motion vector prediction candidates for a data block that is not coded in intra block copy prediction mode.

The candidates in the merge list may include, but are not limited to, one or more of a spatial domain candidate, a time domain candidate, a merge candidate, and a zero motion vector.

Embodiment 10

It may be directly determined whether a current block is coded in intra block copy prediction mode by pre-analyzing reconstructed area information of a slice in which the current block is located, without carrying a flag that specifies whether the current block is coded in intra block copy prediction mode in bitstream data, thereby saving coding bits. The reconstructed area information may include, but is not limited to: a gradient value of surrounding area of a current block, or mode information of adjacent data blocks of the current block.

In an example, if the gradient value of surrounding area of the current block is greater than a preset threshold A, it is directly determined that the current block is coded in intra block copy prediction mode; if the gradient value of surrounding area of the current block is less than a preset threshold B, it is directly determined that the current block is not coded in intra block copy prediction mode, where the surrounding area of the current block may include: left M columns and upper N rows of the current block in a slice in which the current block is located, where M and N are both positive integers, and the preset threshold A is greater than the preset threshold B.

In another example, if a proportion which indicates how many adjacent data blocks of the current block are coded in inter prediction mode exceeds a preset proportion threshold (such as 50%), it is directly determined that the current block is not coded in intra block copy prediction mode.

Figure 5:
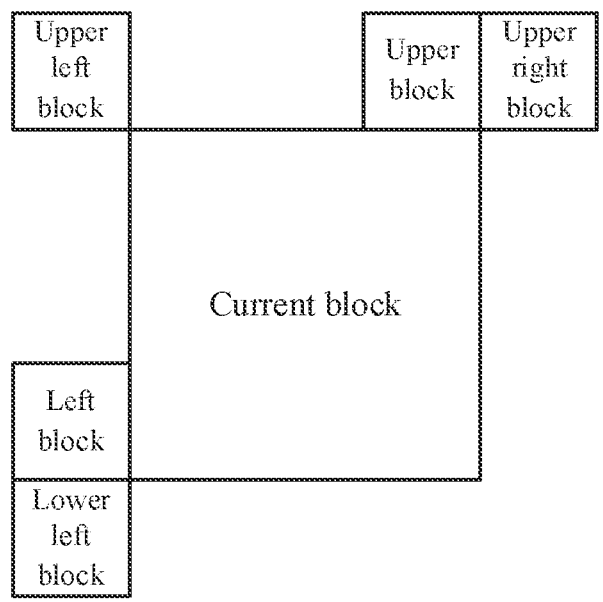
FIG. 5 is a schematic diagram illustrating adjacent data blocks of a current block according to an exemplary embodiment of the present disclosure.

Referring to FIG. 5, the adjacent data blocks of the current block are spatial adjacent blocks, including a lowermost spatial adjacent block on left side of the current block (that is, a left block in FIG. 5), a rightmost spatial adjacent block on upper side of the current block (that is, a upper block in FIG. 5), a nearest spatial adjacent block on upper right corner of the current block (that is, a upper right block in FIG. 5), a nearest spatial adjacent block on lower left corner of the current block (that is, a lower left block in FIG. 5), and a nearest spatial adjacent block on upper left corner of the current block (that is, a upper left block in FIG. 5).

It should be noted that in the embodiment, a video coder and a video decoder use the same strategy to determine whether the current block is coded in intra block copy prediction mode. If it fails to determine whether the current block is coded in intra block copy prediction mode according to the strategy, other strategies can be used to further determine whether the current block is coded in intra block copy prediction mode.

For example, assuming that the gradient value of surrounding area of the current block is greater than the preset threshold B but less than the preset threshold A, at the coding end, it can be determined whether the current block is to be coded in intra block copy prediction mode according to a rate distortion cost, that is, determining an mode with a lowest rate distortion cost as an intra prediction mode for coding the current block from the intra block copy prediction mode, a DC mode, a Planar mode, an angular mode, and a cross-component prediction mode. When it is determined that the mode with the lowest rate distortion cost is the intra block copy prediction mode, it is determined that the current block is to be coded in intra block copy prediction mode, and second indication information is carried in the bitstream data of the current block. At the decoding end, if it is parsed that the second indication information is carried in the bitstream data of the current block, it is determined that the current block is coded in intra block copy prediction mode.

The methods according to embodiments of the present disclosure have been described above. Apparatuses according to embodiments of the present disclosure will be described below.

Figure 6:
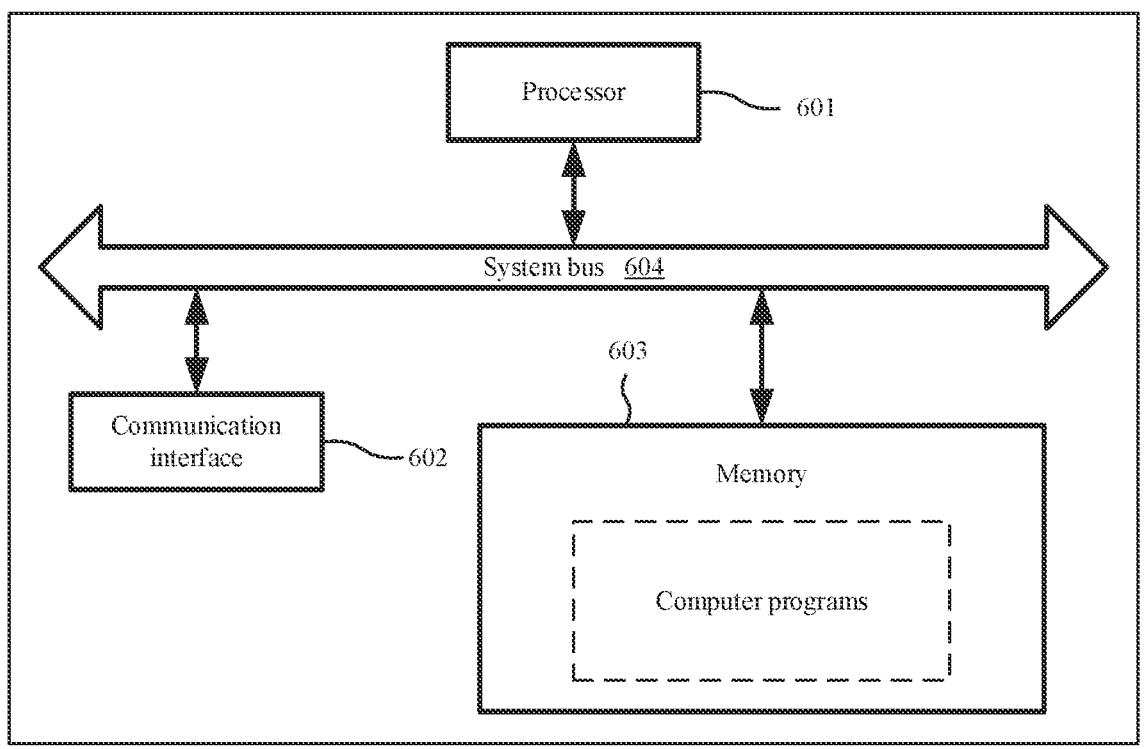
FIG. 6 is a schematic structural diagram of a video coding apparatus according to an exemplary embodiment of the present disclosure.

FIG. 6 is a schematic structural diagram of a video coding apparatus according to an exemplary embodiment of the present disclosure. The video coding apparatus may include a processor 601, a communication interface 602, a memory 603, and a system bus 604. The processor 601, the communication interface 602, and the memory 603 may communicate with each other via the system bus 604. Computer programs are stored in the memory 603. The processor 601 may implement video coding methods according to the above method embodiments by executing the computer programs stored in the memory 603.

The memory 603 may be an electronic, magnetic, optical or other physical storage device, and may contain or store information such as executable instructions, data, and the like. For example, the memory 603 may include volatile memory (such as Random Access Memory (RAM)), non-volatile memory (such as flash memory, storage drive (such as hard disk drive), solid state hard disk, optical memory (such as Compact Disc Read-Only Memory (CD-ROM), Digital Versatile Disc (DVD), etc.), or combinations thereof.

An embodiment of the present disclosure may further provide a machine-readable storage medium storing computer programs, for example, the memory 603 in FIG. 6. When the computer programs are executed by the processor, the processor may be caused to implement video coding methods according to the above method embodiments.

Figure 7:
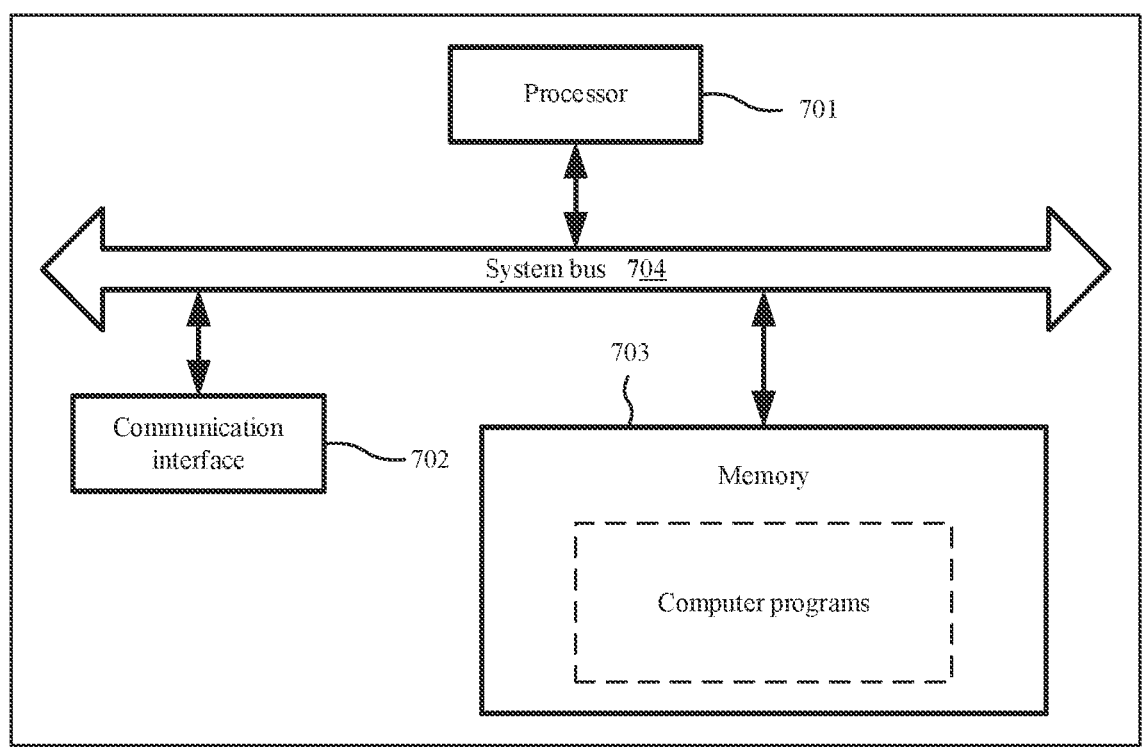
FIG. 7 is a schematic structural diagram of a video decoding apparatus according to an exemplary embodiment of the present disclosure.

FIG. 7 is a schematic structural diagram of a video decoding apparatus according to an exemplary embodiment of the present disclosure. The video decoding apparatus may include a processor 701, a communication interface 702, a memory 703, and a system bus 704. The processor 701, the communication interface 702, and the memory 703 may communicate with each other via the system bus 704. Similar to the memory 603 described above, the memory 703 may be an electronic, magnetic, optical or other physical storage device on which computer programs are stored. The processor 701 may implement video decoding methods according to the above method embodiments by executing the computer programs stored in the memory 703.

An embodiment of the present disclosure can further provide a machine-readable storage medium storing computer programs, for example, the memory 703 in FIG. 7. When the computer programs are executed by the processor, the processor may be caused to implement video decoding methods according to the above method embodiments.

It should be noted that, in this context, terms such as first and second, etc. are merely used to distinguish one entity or operation from another entity or operation, and do not necessarily require or imply that there is any such actual relationship or order between these entities or operations. Moreover, the terms "comprising", "including" or any other variation thereof, are intended to cover non-exclusive inclusion such that a process, method, article or device including a series of elements may include not only those elements, but also other elements not explicitly listed. Without more limitation, the elements defined by the statement "including a . . . ." do not preclude the presence of additional identical elements in the process, method, article or device including the elements.

The above descriptions are merely some embodiments of the present disclosure, and are not intended to limit the present disclosure. Any modification, equivalent replacement and improvement etc. made within the spirit and principle of the present disclosure should be included within the scope of protection of the present disclosure.

The invention claimed is:

1. A decoding method, comprising:
   acquiring bitstream data corresponding to a current block; and
   when it is determined that a first indication information and a second indication information is carried in the bitstream data corresponding to the current block, determining that the current block is coded in intra block copy prediction mode,
   wherein
      the first indication information comprises a first flag, the first flag specifies that a slice in which the current block is located is I slice,
      the second indication information specifies that the current block is coded in intra block copy prediction mode.

2. The method according to claim 1, wherein
   the second indication information comprises a second flag, and
   in response to that a value of the second flag is a first value, the second flag specifies that the current block is coded in intra block copy prediction mode.

3. The method according to claim 1, wherein when it is determined that the first indication information and the second indication information is carried in the bitstream data corresponding to the current block, determining that the current block is coded in intra block copy prediction mode, comprises:
   in response to determining that the slice in which the current block is located is I slice according to the first indication information, determining whether the current block is coded in intra block copy prediction mode according to the second indication information carried in the bitstream data corresponding to the current block, wherein the I slice is coded in dual tree mode in which
   a dual tree is used to partition a coding tree node, and
   for a luma coding unit, whether the luma coding unit is coded in intra block copy prediction mode is determined according to the second indication information.

4. The method according to claim 1, wherein in response to determining that the current block is coded in intra block copy prediction mode, the method further comprises:

determining that information of an inter prediction mode in which a current picture is not added into a reference picture list, wherein the information of the inter prediction mode comprises information about one or more of:

a merge mode with motion vector difference MVD of the current block MMVD, affine model-based motion compensation, or combined inter-picture merge and intra-picture prediction CIIP.

5. The method according to claim 1, further comprises:

for a first slice that is coded in intra block copy prediction mode and a second slice for which intra block copy prediction mode is disabled, respective common syntax elements of the first slice and the second slice maintain the same entropy coding context initial value.

6. The method according to claim 5, wherein the first slice is an I slice, and the second slice is an I slice.

7. The method according to claim 1, further comprises:

for a first data block that is coded in intra block copy prediction mode and a second data block that is not coded in intra block copy prediction mode, and a maximum number of intra block copy merging block vector prediction candidates for the first data block is smaller than a maximum number of merge motion vector prediction candidates for the second data block.

8. A coding method applied to a coder, comprising:

in response to determining that a current block is coded in intra block copy prediction mode, carrying first indication information and second indication information in bitstream data corresponding to the current block, wherein the first indication information comprises a first flag, the first flag specifies that a slice in which the current block is located is I slice, the second indication information specifies that the current block is coded in intra block copy prediction mode; and sending the bitstream data with the first indication information and the second indication information.

9. The method according to claim 8, wherein the second indication information comprises a second flag, and in response to that a value of the second flag is a first value, the second flag specifies that the current block is coded in intra block copy prediction mode.

10. The method according to claim 8, wherein when it is determined that the first indication and the second indication is carried in the bitstream data corresponding to the current block, determining that the current block is coded in intra block copy prediction mode, comprises:

in response to determining that the slice in which the current block is located is I slice according to the first indication information, determining whether the current block is coded in intra block copy prediction mode according to the second indication information carried in the bitstream data corresponding to the current block, wherein the I slice is coded in dual tree mode in which a dual tree is used to partition a coding tree node, and for a luma coding unit, whether the luma coding unit is coded in intra block copy prediction mode is determined according to the second indication information.

11. The method according to claim 8, wherein determining that the current block is coded in intra block copy prediction mode comprises:

in a case that the slice in which the current block is located is I slice and the intra block copy prediction mode is a mode with a lowest rate distortion cost, determining that the current block is coded in intra block copy prediction mode.

12. The method according to claim 8, wherein in response to determining that the current block is coded in intra block copy prediction mode, not coding information of an inter prediction mode in which a current picture is not added into a reference picture list, wherein the information of the inter prediction mode comprises information about one or more of:

a merge mode with motion vector difference MVD of the current block MMVD, affine model-based motion compensation, or combined inter-picture merge and intra-picture prediction CIIP.

13. The method according to claim 8, wherein for a first slice that is coded in intra block copy prediction mode and a second slice for which intra the block copy mode is disabled, respective common syntax elements of the first slice and the second slice maintain the same entropy coding context initial value.

14. The method according to claim 13, wherein the first slice is an I slice, and the second slice is an I slice.

15. The method according to claim 8, further comprises:

for a first data block that is coded in intra block copy prediction mode and a second data block that is not coded in intra block copy prediction mode, a maximum number of intra block copy merging block vector prediction candidates for the first data block is smaller than a maximum number of merge motion vector prediction candidates for the second data block.

16. A video decoder, comprising a processor, a communication interface, a memory and a communication bus, wherein the processor, the communication interface and the memory communicate with each other via the communication bus;

the memory is configured to store computer programs; and the processor is configured to execute the computer programs stored in the memory to perform following actions, comprising:

acquiring bitstream data corresponding to a current block; and when it is determined that a first indication information and a second indication information is carried in the bitstream data corresponding to the current block, determining that the current block is coded in intra block copy prediction mode, wherein the first indication information comprises a first flag, the first flag specifies that a slice in which the current block is located is I slice, the second indication information specifies that the current block is coded in intra block copy prediction mode.

17. A video coder, comprising a processor, a communication interface, a memory and a communication bus, wherein
   the processor, the communication interface and the memory communicate with each other via the communication bus;
   the memory is configured to store computer programs; and
   the processor is configured to execute the computer programs stored in the memory to implement the coding method according to claim 8.

* * * * *